US 8,838,814 B2

(12) United States Patent
Wang et al.

(10) Patent No.: US 8,838,814 B2
(45) Date of Patent: Sep. 16, 2014

(54) METHOD, APPARATUS AND SYSTEM FOR ESTABLISHING A CONNECTION

(75) Inventors: Shanshan Wang, Shenzhen (CN); Ying Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 12/471,663

(22) Filed: May 26, 2009

(65) Prior Publication Data

US 2010/0211688 A9 Aug. 19, 2010

Related U.S. Application Data

(63) Continuation of application No. PCT/CN2008/071158, filed on May 31, 2008.

(30) Foreign Application Priority Data

Jun. 14, 2007 (CN) .......................... 2007 1 0028575
Nov. 7, 2007 (CN) .......................... 2007 1 0165080

(51) Int. Cl.
*G06F 15/16* (2006.01)
*H04W 48/00* (2009.01)
*H04W 76/02* (2009.01)
*H04W 8/12* (2009.01)
*H04W 80/04* (2009.01)

(52) U.S. Cl.
CPC ............ *H04W 48/17* (2013.01); *H04W 76/022* (2013.01); *H04W 8/12* (2013.01); *H04W 80/045* (2013.01)
USPC ........................................................ 709/228

(58) Field of Classification Search
USPC ........................................................ 709/228
See application file for complete search history.

(56) References Cited

U.S. PATENT DOCUMENTS 6,226,679 B1 * 5/2001 Gupta ........................... 709/230
6,847,610 B1 1/2005 Suumäki et al.
(Continued)

FOREIGN PATENT DOCUMENTS

CN 1382351 A 11/2002
CN 1568050 A 1/2005
(Continued)

OTHER PUBLICATIONS

Extended European Search Report in corresponding European Application No. 08757569.2 (Apr. 19, 2011).
(Continued)

*Primary Examiner* — Rupal Dharia
*Assistant Examiner* — Robert B McAdams
(74) *Attorney, Agent, or Firm* — Leydig, Voit & Mayer, Ltd.

(57) ABSTRACT

A method for establishing a connection includes the following steps: A mobility management entity generates a create bearer context request message and sends the message to a selected serving gateway. The create bearer context request message at least includes address information of at least one packet data network gateway and corresponding indication information of the protocol type of connection establishment. The serving gateway receives and analyzes the create bearer context request message, and determines the protocol type of the connection according to the indication information of the protocol type of connection establishment. The serving gateway processes the create bearer context request message with the determined protocol type of connection. Further provided are a mobility management entity, a serving gateway, and a network system which are able to reduce time delay when connection is established.

20 Claims, 4 Drawing Sheets

(56) References Cited

U.S. PATENT DOCUMENTS

| | | | |
|---|---|---|---|
| 6,950,876 B2* | 9/2005 | Bright et al. | 709/230 |
| 7,644,169 B2* | 1/2010 | Cleghorn et al. | 709/230 |
| 8,009,641 B2* | 8/2011 | Grech et al. | 370/338 |
| 8,072,936 B2* | 12/2011 | Shaheen | 370/331 |
| 8,107,433 B2* | 1/2012 | Jokinen | 370/331 |
| 8,139,530 B2* | 3/2012 | Herrero-Veron | 370/329 |
| 8,170,566 B2 | 5/2012 | Pudney | |
| 2005/0059396 A1 | 3/2005 | Chuah et al. | |
| 2007/0014291 A1 | 1/2007 | Zhang | |
| 2007/0213060 A1* | 9/2007 | Shaheen | 455/436 |
| 2008/0214189 A1* | 9/2008 | Taaghol | 455/432.2 |
| 2008/0225807 A1* | 9/2008 | Patil | 370/338 |
| 2009/0043902 A1 | 2/2009 | Faccin | |
| 2009/0047947 A1* | 2/2009 | Giaretta et al. | 455/432.1 |

FOREIGN PATENT DOCUMENTS

| | | |
|---|---|---|
| CN | 1625152 A | 6/2005 |
| CN | 1642130 A | 7/2005 |
| CN | 1787523 A | 6/2006 |
| CN | 101325592 B | 4/2011 |
| WO | WO 2004/045224 A1 | 5/2004 |
| WO | WO 2004/082236 A1 | 9/2004 |

OTHER PUBLICATIONS

Wang et al., "Analysis and implementation of GTP in GSN," Feb. 2004, vol. 21, No. 1, Journal of CTBU (Natural Science Edition), Chongqing, China.

Yu et al., "Implementation of Prototype of a COBRA/CMIP Gateway," Communications Technology, Mar. 2001, No. 114, PLA University of Science and Technology, Nanjing, China.

"S2-071691—refine attach procedure," 3GPP TSG SA WG2 Architecture S2#57, Apr. 23-27, 2007, Huawei, Beijing, China.

"S2-071697—Initial LTE attachment via S8b," 3GPP TSG SA WG2 Architecture S2#57, Apr. 23-27, 2007, Huawei, Beijing, China.

"3GPP TS 23.401—3rd Generation Partnership Project; Technical Specification Group Services and System Aspects; GPRS enhancements for E-UTRAN access; Release 8," May 2007, Version 0.5.1, 3rd Generation Partnership Project, Valbonne, France.

"3GPP TS 23.402—3rd Generation Partnership Project; Technical Specification Group Services and System Aspects; Architecture Enhancements for non-3GPP accesses (Release 8)," Jun. 2007, Version 1.1.0, 3rd Generation Partnership Project, Valbonne, France.

Written Opinion of the International Searching Authority in corresponding PCT Application No. PCT/CN2008/071158 (Aug. 28, 2008).

"3GPP TS 23.060—Technical Specification Group Services and System Aspects; General Packet Radio Service (GPRS); Service description; Stage 2 (Release 7)," Mar. 2007, Version 7.4.0, 3rd Generation Partnership Project, Valbonne, France.

"3GPP TS 23.401—Technical Specification Group Services and System Aspects; 3GPP System Architecture Evolution: GPRS enhancements for E-UTRAN access; Release 8," Apr. 2007, Version 0.4.1, 3rd Generation Partnership Project, Valbonne, France.

"3GPP TS 23.402—Technical Specification Group Services and System Aspects; 3GPP System Architecture Evolution: Architecture Enhancements for non-3GPP accesses; Release 8," Apr. 2007, Version 0.4.0, 3rd Generation Partnership Project, Valbonne, France.

Extended European Search Report in corresponding European Patent Application No. 11196133.0 (Apr. 3, 2012).

International Search Report in corresponding PCT Application No. PCT/CN2008/071158 (Aug. 28, 2008).

U.S. Appl. No. 12/471,663 (Oct. 17, 2011).

"TS 29.060—3rd Generation Partnership Project; Technical Specification Group Core Network and Terminals; General Packet Radio Service (GPRS); GPRS Tunneling Protocol (GTP) Across the Gn and Gp Interface; (Release 6)," 3GPP Technical Specification, Mar. 2006, V6.12.0, 3GPP, Valbonne, France.

1st Office Action in related U.S. Appl. No. 13/216,040 (Nov. 22, 2013).

Notice of Opposition to a European Patent in corresponding European Patent Application No. 08757569.2 (Feb. 14, 2014).

Communication of a Notice of Opposition in corresponding European Patent Application No. 08757569.2 (Feb. 26, 2014).

Muller, Dr. Markus G., "Annex I: Facts and Arguments," in Opposition to European Patent EP2104288B1 of Huawei Technologies Co., Ltd. (Feb. 14, 2014).

"Handover Scenarios between 3GPP and Untrusted non-3GPP Access systems using S2c Reference Point," 3GPP TSG SA WG2 Architecture—52#57, Beijing, China, Document S2-072294, 3rd Generation Partnership Project, Valbonne, France (Apr. 23-27, 2007).

"3GPP TS 23.402—3rd Generation Partnership Project; Technical Specification Group Services and System Aspects; Architecture Enhancements for non-3GPP accesses (Release 8)," Version 1.0.0, 3rd Generation Partnership Project, Valbonne, France (May 2007).

"Impact on S11/S4 Interface in case Serving GW Supporting Both PMIP and GTP," 3GPP TSG SA WG2 Meeting #61, Ljubljana, Slovenia, Document TD S2-075681, 3rd Generation Partnership Project, Valbonne, France (Nov. 12-16, 2007).

"3GPP access: GTP-to-PMIP Roaming: Text Proposal," 3GPP TSG SA WG2 Architecture—S2#60, Kobe, Japan, Document S2-074725, 3rd Generation Partnership Project, Valbonne, France (Oct. 8-12, 2007).

"Handover from non-3GPP Access to E-UTRAN (TS 23.402)," 3GPP TSG SA WG2 Architecture—S2#57, Beijing, China, Document S2-072108, 3rd Generation Partnership Project, Valbonne, France (Apr. 23-27, 2007).

"3GPP TS 23.401—3rd Generation Partnership Project, Technical Specification Group Services and System Aspects; GPRS enhancements for E-UTRAN access (Release 8)," Version 1.0.0, 3rd Generation Partnership Project, Valbonne, France (May 2007).

* cited by examiner

METHOD, APPARATUS AND SYSTEM FOR ESTABLISHING A CONNECTION

CROSS-REFERENCE TO RELATED APPLICATIONS

This application is a continuation of International Patent Application No. PCT/CN2008/071158, filed May 31, 2008, which claims priority to Chinese Patent Application No. 200710028575.4, filed Jun. 14, 2007, and Chinese Patent Application No. 200710165080.6, filed Nov. 7, 2007, all of which are hereby incorporated by reference in their entirety.

FIELD OF THE INVENTION

The present invention relates to system architecture evolution (SAE), and more particularly to a method, an apparatus, and a system for establishing a connection among gateways.

BACKGROUND OF THE INVENTION

In order to increase the competitiveness of future mobile networks, the 3rd generation partnership project (3GPP) is researching a future network architecture. The network architecture includes an SAE at a network side and an evolved universal terrestrial radio access network (E-UTRAN) (i.e., LTE) at a wireless side. The structure of an evolved packet system (EPS) is as shown in FIG. 1, and includes at least three logical function entities, i.e., a mobility management entity, a serving gateway, and a packet data network gateway. The mobility management entity is in charge of mobility management of control-plane, which includes management of user context and mobility status, temporary user identity assignment, security function, etc. The serving gateway is a mobile anchor point for local inter base station handover and inter 3GPP access system handover, and is in charge of managing and storing IP bearer parameters and network routing information, lawful interception, etc. The packet data network gateway is a gateway towards the external network, and is in charge of realizing policy-based management, user-based packet filtering, accounting, lawful interception, user IP address assignment, etc., and therefore serves as a user-plane anchor point among different access systems. Subscription information of users is stored in a home subscriber server (HSS).

A protocol used for an interface between the serving gateway and the packet data network gateway may be the general packet radio service (GPRS) tunneling protocol (GTP), or the proxy mobile IP protocol (PMIP).

Although manners for establishing connections by using different protocols are defined in different transfer services (TS) respectively, in a process of practical network deployment and upgrade, the serving gateway may support multiple connection protocols (for example, the GTP and the PMIP) at the same time, while the packet data network gateway only supports one of them (for example, the GTP). Under this situation, a connection between the serving gateway and the packet data network gateway is usually established by using the following manners.

The serving gateway uses one connection protocol to initiate a connection establishment request to the packet data network gateway. When the packet data network gateway does not support such a protocol, no response is received. After timeout, the serving gateway considers to use another connection protocol again to initiate the connection establishment request. When implementing the present invention, the inventor discovers a disadvantage of such a manner if the connection protocol selected by the serving gateway first time is a connection protocol not supported by the packet data network gateway, a time delay when the connection is established successfully will be extended.

Or, the serving gateway may use multiple protocols supported by the serving gateway at the same time to initiate the connection establishment request to the packet data network gateway. The packet data network gateway selects one or all of the protocols for responses according to its own ability. The serving gateway selects one response message that first reaches to establish a connection. When implementing the present invention, the inventor of the present invention discovers a disadvantage of such a manner for a serving gateway that supports multiple protocols, more processing is required. Also, such a mechanism that a sender sends multiple messages of the same function but with different protocols regardless of the ability of the receiver will consume more processing resources.

SUMMARY OF THE INVENTION

Accordingly, the present invention provides a method, an apparatus, and a system for establishing a connection, which are able to reduce a time delay when a connection is established successfully.

In an embodiment, the present invention provides a method for establishing a connection. The method includes the following steps.

A create bearer context request message is generated.

The create bearer context request message is sent to a selected serving gateway.

The create bearer context request message includes address information of at least one packet data network gateway and corresponding indication information of the protocol type of connection establishment.

In another embodiment, the present invention provides a method for establishing a connection. The method includes the following steps.

The create bearer context request message is received and analyzed, so that the address information of the packet data network gateway and corresponding indication information of the protocol type of connection establishment are obtained.

A protocol type of connection for establishing a connection with the packet data network gateway is determined according to the analyzed indication information of the protocol type of connection establishment.

The create bearer context request message is processed according to the determined protocol type of connection.

In yet another embodiment, the present invention provides a method for establishing a connection. The method is implemented in a system which includes at least a mobility management entity, a serving gateway, and a packet data network gateway. The method includes the following steps.

The mobility management entity generates a create bearer context request message and sends the request message to a selected serving gateway. The create bearer context request message includes address information of at least one packet data network gateway and corresponding indication information of the protocol type of connection establishment.

The serving gateway analyzes the create bearer context request message, and determines the protocol type of connection for establishing a connection with the packet data network gateway according to the corresponding indication information of the protocol type of connection establishment.

The serving gateway processes the create bearer context request message correspondingly according to the determined protocol type of connection establishment.

In another embodiment, the present invention provides a mobility management entity. The mobility management entity includes a packet data network gateway information acquisition unit and a bearer establishment initiation unit.

The packet data network gateway information acquisition unit is adapted to obtain address information of the packet data network gateway and corresponding indication information of the protocol type of connection establishment.

The bearer establishment initiation unit is adapted to generate a create bearer context request message and send the message to a selected serving gateway, wherein the create bearer context request message includes address information of at least one packet data network gateway and the indication information of the corresponding protocol type of connection establishment.

In yet another embodiment, the present invention provides a serving gateway. The serving gateway includes a reception and analysis unit, a protocol type determination unit, and a bearer establishment process unit.

The reception and analysis unit is adapted to receive and analyze a create bearer context request message to obtain address information of a packet data network gateway and indication information of the corresponding protocol type of connection establishment.

The protocol type determination unit is adapted to determine the protocol type of connection for establishing a connection with the packet data network gateway according to an analyzed result of the reception and analysis unit.

The bearer establishment process unit is adapted to process the create bearer context request message accordingly according to the protocol type of connection determined by the protocol type determination unit.

In yet another embodiment, the present invention provides a network system. The network system includes at least a mobility management entity, a serving gateway, and a packet data network gateway.

The mobility management entity is adapted to generate a create bearer context request message and send the message to a selected serving gateway, wherein the create bearer context request message includes at least one address information of the packet data network gateway and indication information of the corresponding protocol type of connection establishment.

The serving gateway is adapted to analyze the create bearer context request message from the mobility management entity, determine the protocol type of connection establishing a connection with the packet data network gateway according to the indication information indicating the protocol type of connection establishment, and process the create bearer context request message correspondingly according to the determined protocol type of connection.

In view of the above, according to the embodiments of the present invention, when the mobility management entity requests to establish a connection with a selected serving gateway, address information of a packet data network gateway may be indicated and the serving gateway may be instructed to obtain the protocol type of connection supported by the packet data network gateway. Thus, the serving gateway may select the protocol supported by the packet data network gateway to initiate to the packet data network gateway to establish a connection, or, to establish a PMIP tunnel, or to assign care-of addresses for the terminal to perform client mobile IP protocol (CMIP) registration, such that a time delay when a connection is established is reduced.

BRIEF DESCRIPTION OF THE DRAWINGS

The present invention will become more better understood from the detailed description given herein below for illustration only, and thus is not limitative of the present invention, and wherein.

DETAILED DESCRIPTION OF THE EMBODIMENTS

The present invention is illustrated in detail in the following with reference to the accompanying drawings and preferred embodiments.

Figure 1:
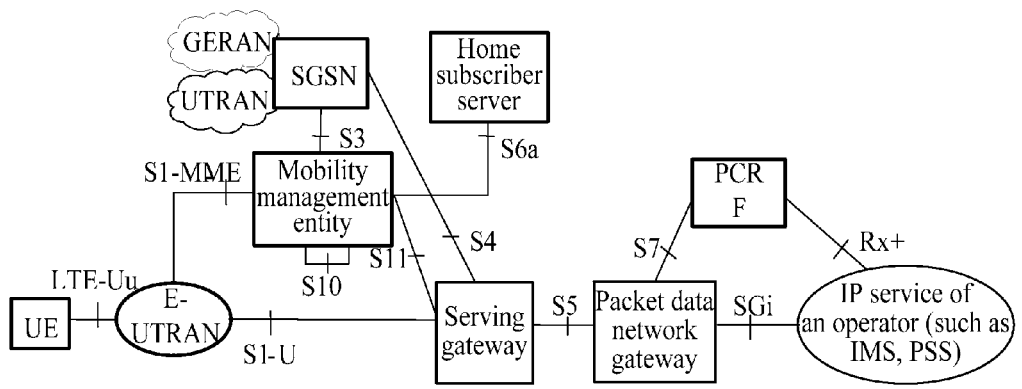
FIG. 1 is a schematic structural view of an EPS.
Figure 2:
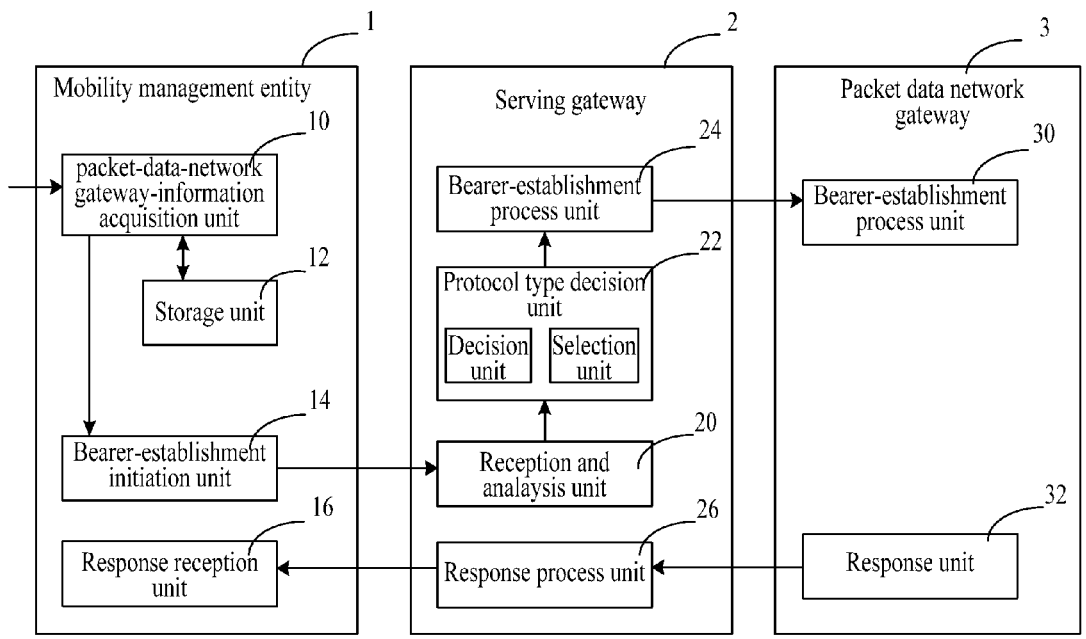
FIG. 2 is a schematic structural view of a network system for establishing a connection according to a first embodiment of the present invention.

FIG. 2 is a schematic structural view of a network system for establishing a connection according to a first embodiment of the present invention. The system in the embodiment includes at least a mobility management entity 1, at least one serving gateway 2, and a packet data network gateway 3.

The mobility management entity 1 is adapted to generate a create bearer context request message and send the message to a selected serving gateway 2, wherein the create bearer context request message includes at least address information of the specific packet data network gateway 3 and indication information indicating the corresponding protocol type of connection establishment. In a specific implementation, the indication information indicating the protocol type of connection establishment is used to indicate the protocol type of connection supported by the specific packet data network gateway.

The serving gateway 2 is adapted to receive and analyze the create bearer context request message from the mobility management entity 1, and determine the protocol type of connection according to the indication information indicating the protocol type of connection establishment in the analyze result, and negotiate with the packet data network gateway 3 to establish a connection by using the determined connection protocol.

In practical implementation, the mobility management entity 1 may include a storage unit 12, a packet-data-network-gateway-information acquisition unit 10, a bearer-establishment initiation unit 14, and a response reception unit 16.

The storage unit 12 is adapted to store address information of at least one packet data network gateway and indication information indicating the corresponding protocol type of connection establishment in advance (for example, the information may be manually configured). The indication information indicating the protocol type of connection establishment is adapted to indicate the protocol type of connection supported by the packet data network gateway. The protocol type of connection is at least one of the GTP, the PMIP, and the CMIP. In other embodiments, the storage unit may also be disposed in other network entities, which will be discussed in detail in the following.

The packet-data-network gateway-information acquisition unit 10 is adapted to obtain address information of the specific packet data network gateway and indication information indicating a corresponding protocol type of connection establishment (for example, information of the protocol type of connection supported by the packet data network gateway or information of the protocol type configured in advance). Such information may be obtained from the storage unit 12.

The bearer-establishment initiation unit 14 is adapted to generate a create bearer context request message and send the message to a selected serving gateway. The create bearer context request message at least carries address information of at least one packet data network gateway and indication information indicating the corresponding protocol type of connection establishment (for example, information of the protocol type of connection supported by the packet data network gateway), and also carries a user equipment (UE) identifier, a context identifier of a mobility management entity, and other bearer-related information. Each of the indication information indicating the corresponding protocol type of connection establishment may indicate that one or more types of connection protocol (for example, the GTP, the PMIP, and the GTP/PMIP) are available.

The response reception unit 16 is adapted to receive the create bearer context request response message from the serving gateway 2.

The serving gateway 2 includes a reception and analysis unit 20, a protocol type determination unit 22, a bearer-establishment process unit 24, and a response process unit 26.

The reception and analysis unit 20 is adapted to receive and analyze the create bearer context request message from the mobility management entity 1, so as to obtain address information of the packet data network gateway and indication information indicating the corresponding protocol type of connection establishment (for example, information of the protocol type of connection supported by the packet data network gateway), and some other related information.

The protocol type determination unit 22 determines one of the types of connection protocol (for example, the GTP or the PMIP) as a protocol type of connection for establishing a connection with the packet data network gateway according to an analyzed result of the reception and analysis unit 20.

The bearer-establishment process unit 24 is adapted to process the create bearer context request message correspondingly according to the protocol type of connection determined by the protocol type determination unit 22. Specifically, the corresponding process is described as follows. If the determined protocol type of connection is the GTP, the create bearer context request information is forwarded to the packet data network gateway, and a connection with the packet data network gateway is established. Or, if the determined protocol type of connection is the PMIP, a corresponding PMIP-binding update message is sent to the packet data network gateway, so as to establish a PMIP tunnel between the serving gateway and the packet data network gateway. Or, if the determined protocol type of connection is the CMIP, a care-of address is assigned and sent to the user terminal for the user terminal to perform CMIP registration.

The response process unit 26 is adapted to receive a response message from the packet data network gateway for processing (for example, returning a response to the mobility management entity 1).

In an embodiment of the present invention, the protocol type determination unit 22 may further include a determination unit and a selection unit.

The determination unit is adapted to determine whether the serving gateway 2 supports the protocol type of connection in the indication information indicating the protocol type of connection establishment that is analyzed by the reception and analysis unit.

The selection unit is adapted to select one protocol type of connection that is supported according to the determination result and determine that such a protocol type of connection is the one that the serving gateway will use. For example, when the indication information in the request message from the mobility management entity 1 indicates that one protocol type of connection is supported by the packet data network gateway, and the determination unit determines that the serving gateway 2 also supports the protocol type of connection, the connection protocol is the determined protocol type of connection. When the indication information indicates that a plurality of types of connection protocol is supported by the packet data network gateway, the protocol type of connection supported by the serving gateway 2 is preferably selected as the determined protocol type of connection. If the serving gateway 2 supports all these types of connection protocol, one of the types (for example, randomly, or the first one) is selected as the determined connection protocol type.

In the embodiments above, the information of the packet data network gateway related to that a UE requests to establish a connection (information of address and the supported types of connection protocol) is stored in the mobility management entity 1 in advance. The present invention is not limited thereto, and the information may also be obtained from other places.

Figure 3:
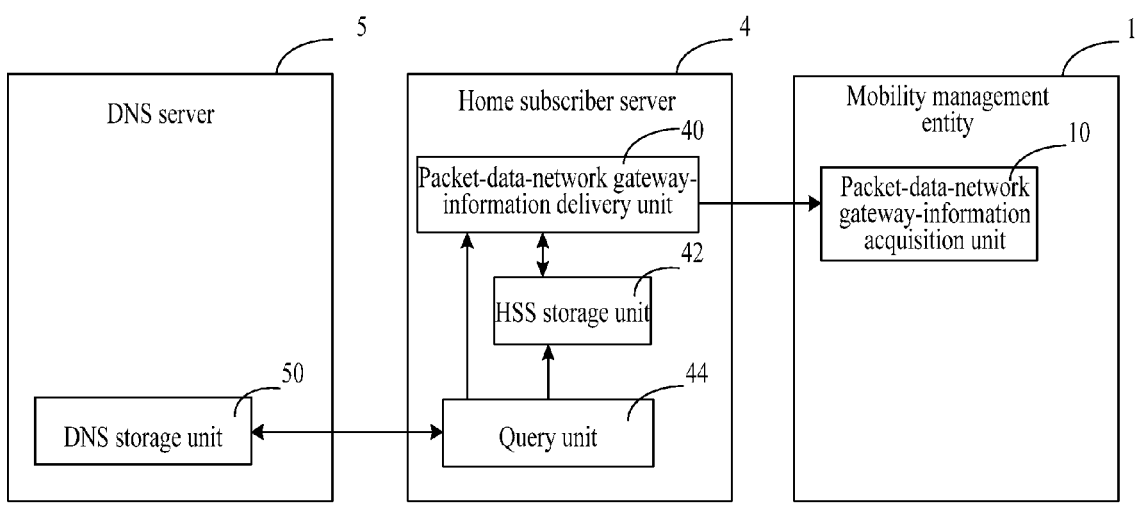
FIG. 3 is a schematic structural view of obtaining information of a packet data network gateway according to an embodiment of the present invention.

FIG. 3 is a schematic structural view of obtaining information of a packet data network gateway according to an embodiment of the present invention. The information of the packet data network gateway may be stored in an HSS 4. The mobility management entity 1 may communicate with the HSS 4 through an S6a interface to obtain the information. In a practical implementation, the HSS 4 may include an HSS storage unit 42 and a packet data network gateway information delivery unit 40.

The HSS storage unit 42 is adapted to store information of a packet data network gateway corresponding to a subscriber (for example, address information and information of its supported protocol type of connection). The information of the packet data network gateway is correlated to access point names (APNs). Each APN corresponds to information of a plurality of packet data network gateways.

The packet data network gateway information delivery unit 40 is adapted to send the information of the packet data network gateways that the mobility management entity 1 requires to the mobility management entity 1 according to the user subscription information and other affiliated rules.

In addition, the information of the packet data network gateway that the mobility management entity 1 requires may come from a DNS server. For example, in other embodiments, a DNS server 5 may be further included. A DNS storage unit 50 of the DNS server 5 stores information of corresponding packet data network gateways (address information and information of its supported protocol type of connection). The information of the packet data network gateway is correlated to APNs. Each APN may correspond to information of a plurality of packet data network gateways.

The HSS 4 further includes a query unit 44, which is adapted to send a DNS query request (for example, carrying APN information) to the DNS server 5, and receive query result from the DNS server 5. The HSS 4 may store the query results, or provide the query results to the mobility management entity 1.

The packet-data-network gateway-information acquisition unit 10 is adapted to obtain address information of the specific packet data network gateway and indication information indicating a corresponding protocol type of connection establishment. For example, the information delivered from the packet-data-network gateway-information delivery unit 40 may be received.

Figure 4:
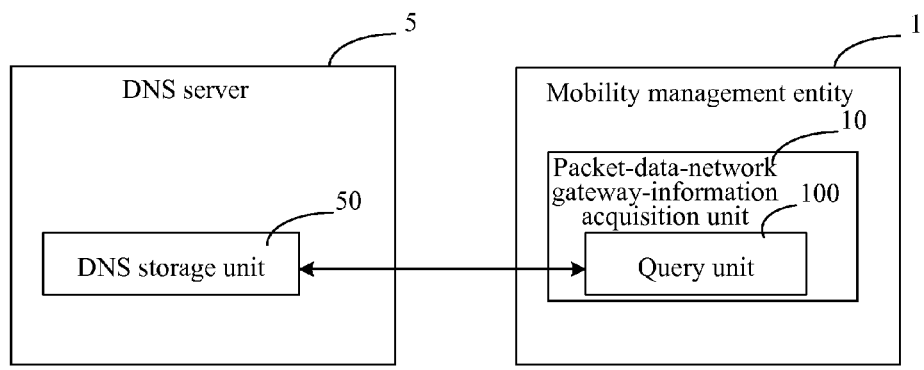
FIG. 4 is a schematic structural view of obtaining information of a packet data network gateway according to another embodiment of the present invention.

FIG. 4 is a schematic structural view of obtaining information of a packet data network gateway according to another embodiment of the present invention. In the embodiment, the mobility management entity 1 may query the DNS server 5 directly for the required information of a packet data network gateway. In practical implementation, a query request may be sent to the DNS server 5 through a query unit 100 in the packet-data-network gateway-information acquisition unit 10. The query request carries APN information. The DNS server 5 returns the queried information of the packet data network gateway corresponding to the APN to the mobility management entity 1.

Implementation processes of the embodiments of the present invention are illustrated in the following with reference to FIGS. 5-8.

Figure 5:
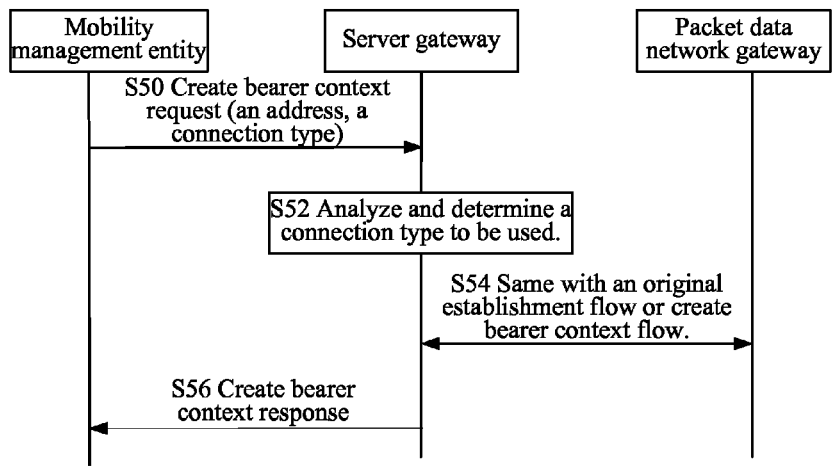
FIG. 5 is a flow chart of a method for establishing a connection according to a first embodiment of the present invention.

FIG. 5 is a flow chart of a method for establishing a connection according to a first embodiment of the present invention.

In Step S70, the mobility management entity 1 obtains (for example, from its own storage unit) an address of a specific packet data network gateway and the protocol type of connection supported by the packet data network gateway (such as the GTP, the PMIP, and the GTP/PMIP). A create bearer context request message including the above-mentioned information is generated, and the request message is sent to one selected serving gateway. Illustrations are provided in the following taking the protocol type of connection supported by the packet data network gateway being GTP/PMIP as an example, that is, the packet data network gateway supports two types of connection protocol at the same time.

It should be noted that, the request message may include a plurality of addresses of the packet data network gateway, and each packet data network gateway needs to correspond to its supported protocol type of connection.

In Step S52, the selected serving gateway receives the create bearer context request message, analyzes the information in the request message, and determines a protocol type of connection used to establish a connection with the packet data network gateway.

From the request message, the serving gateway analyzes the address of the packet data network gateway, the protocol type of connection supported by the packet data network gateway supports being GTP/PMIP, and some other information.

The serving gateway determines whether the serving gateway supports the two connection protocols or not. If only one of the two is supported, it is determined that the supported connection protocol serves as the protocol type of connection for negotiating a connection with the packet data network gateway. If both the two are supported, one of the two is selected (for example, the GTP) and determined to be the protocol type of connection for negotiating a connection with the packet data network gateway.

In Step S54, the serving gateway performs corresponding process with the packet data network gateway according to the selected connection protocol, for example, connection negotiation. The process is described as follows.

(1) If the serving gateway selects the GTP, the following process is as follows.

The serving gateway creates one entry in its own EPS bearer table, sends a create bearer context request message to the packet data network gateway, and carries in the request message a user-plane address assigned by the serving gateway, a user-plane tunnel endpoint identifier (TEID) of the serving gateway, and a control-plane TEID of the serving gateway;

The packet data network gateway returns a create bearer context response message to the serving gateway, and carries in the response message a user-plane address of the packet data network gateway, a user-plane TEID of the packet data network gateway, and an IP address that the packet data network gateway assigns to the UE.

(2) If the serving gateway selects a PMIP, the following process is as follows.

The serving gateway creates one entry in its own EPS bearer table, sends a PMIP-binding update request message to the packet data network gateway, and carries in the request message information related to establishing a PMIP tunnel.

The packet data network gateway returns a PMIP-binding update response message to the serving gateway, and carries an IP address assigned by the packet data network gateway to the UE in the response message.

In Step S56, the serving gateway returns a create bearer context response message to the mobility management entity, and carries in the response message information such as an IP address of the UE, a user address of the serving gateway, and a user-plane TEID of the serving gateway.

Until now, the process of bearer establishment is completed.

Figure 6:
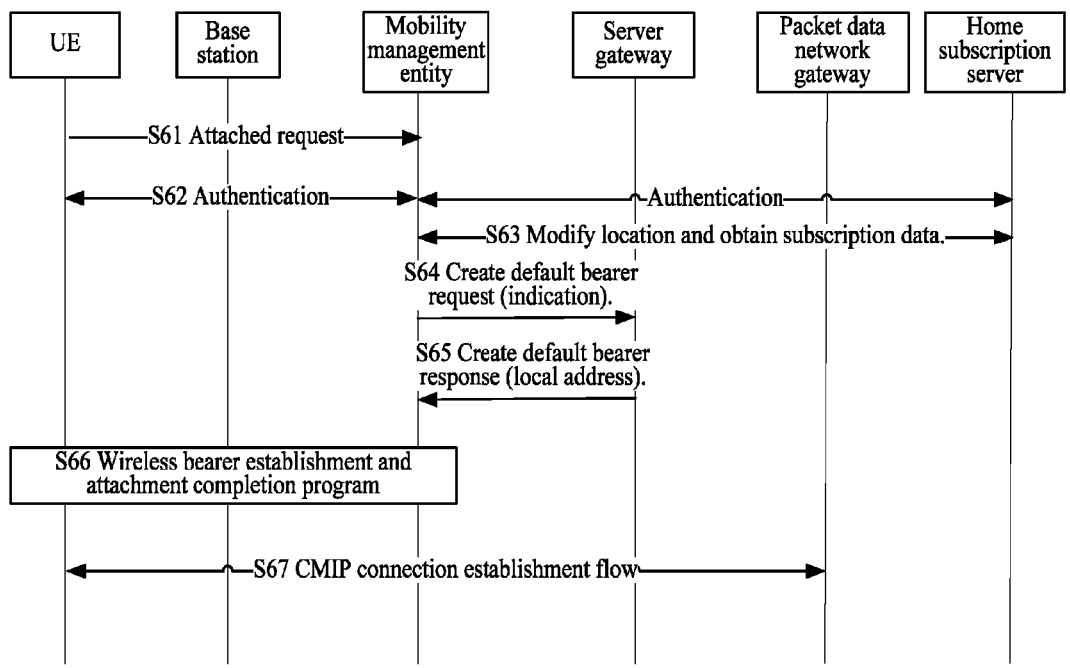
FIG. 6 is a flow chart of a method for establishing a connection according to a second embodiment of the present invention.

FIG. 6 is a flow chart of a method for establishing a connection according to a second embodiment of the present invention. In this embodiment, a UE adopts a CMIP as a mobility management protocol. The flow includes the following steps.

In Step S61, the UE may report a CMIP capacity to a mobility management entity in an access request (for example, attached request). The step is optional.

In Step S62, an authentication process is performed among the mobility management entity, an HSS and the UE.

In Step S63, in a location registration process, the mobility management entity may obtain subscription data of the UE from the HSS. The subscription data includes information of a packet data network gateway.

In Step S64, when the mobility management entity determines that the UE needs to use a CMIP manner to establish a connection with the packet data network gateway. The mobility management entity selects one serving gateway having an IP address assignment capacity, and sends a create bearer context request to the selected serving gateway. The mobility management entity carries related type indication information in the create bearer context request to inform the serving gateway. The UE uses the CMIP manner. In practical application, the type indication information may be, for example, requesting the serving gateway to assign one local IP address (for the UE to perform CMIP registration with the packet data network). Alternatively, the mobility management entity may not carry the address of the packet data network gateway in the create bearer context request message (that is, the address of the packet data network gateway is null), and which serves as the type indication information.

In Step S65, after receiving the create bearer context request, the serving gateway analyzes the type indication information and learns that the UE needs to use a CMIP to establish a connection with the packet data network gateway. The CMIP protocol is determined as the protocol type of connection for negotiating a connection with the packet data network gateway. And, a local address is assigned, and the address is provided to the mobility management entity in a create bearer context response message.

In Step S66, a wireless bearer is established between the mobility management entity and a base station as well as between the mobility management entity and the UE. The mobility management entity sends to the UE the local address assigned by the serving gateway. At the same time, an address of the packet data network gateway (or information of the packet data network gateway obtained from the HSS by the mobility management entity) analyzed by the mobility management entity may also be sent to the UE. The step of sending the address or information of the packet data network gateway is optional.

In Step S67, the UE initiates a CMIP connection establishment flow to the packet data network gateway. The address of the packet data network gateway may be obtained through a DNS process performed by the UE on the information of the packet data network gateway, or may also be obtained directly from the mobility management entity.

Figure 7:
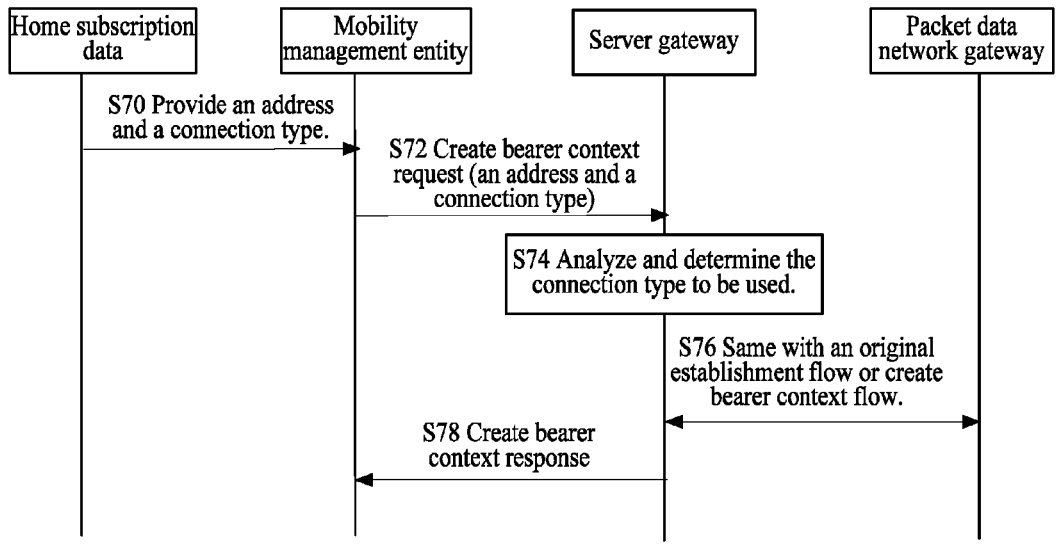
FIG. 7 is a flow chart of a method for establishing a connection according to a third embodiment of the present invention.

FIG. 7 is a flow chart of a method for establishing a connection according to a third embodiment of the present invention.

In Step S70, an HSS provides APNs and information of corresponding packet data network gateway (for example, an address, a protocol type of connection that the packet data network gateway supports) to a mobility management entity according to the user subscription information and other affiliated rules. The protocol type of connection may be the GTP, the PMIP, and the GTP/PMIP. When a plurality of addresses of the packet data network gateway is sent to the mobility management entity by the HSS, each packet data network gateway address needs to correspond to one protocol type of connection.

The step may be executed in the step that the HSS insert user information into the mobility management entity.

Steps S72 to S78 in the following are similar to Steps S50 to S56 in FIG. 5 in principle, which are not repeated here.

Figure 8:
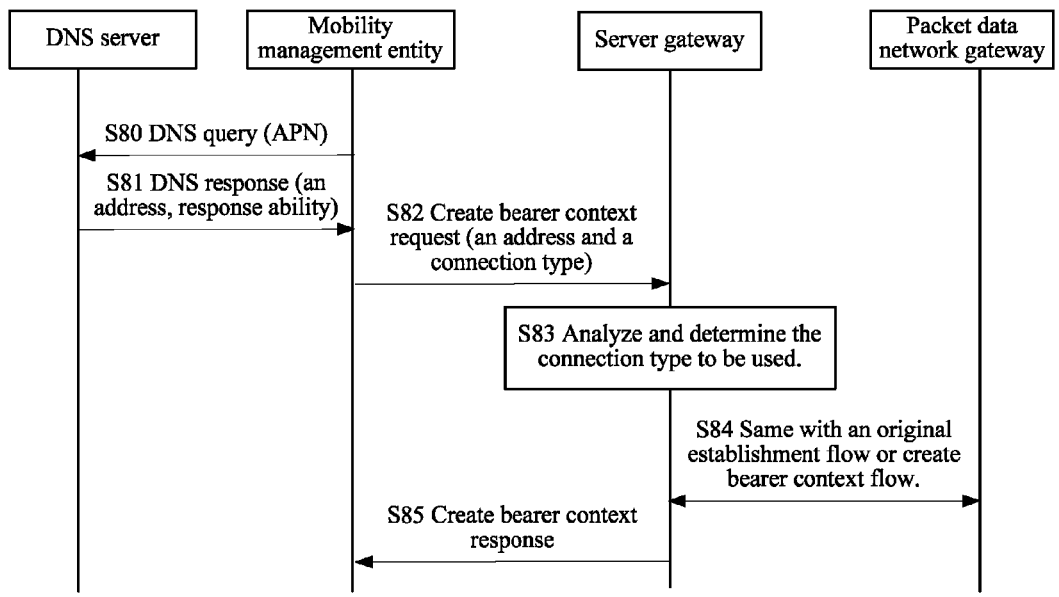
FIG. 8 is a flow chart of a method for establishing a connection according to a fourth embodiment of the present invention.

FIG. 8 is a flow chart of a method for establishing a connection according to a fourth embodiment of the present invention.

In Step S80, the mobility management entity initiates a query to a DNS server, carries APNs in the query request for the DNS server to search for information of the corresponding packet data network gateway.

In Step S81, the DNS server returns the searched information of the packet data network gateway to the mobility management entity, that is, an address of a packet data network gateway and a protocol type of connection that the packet data network gateway supports. The protocol type of connection may be the GTP, the PMIP, and the GTP/PMIP. When a plurality of addresses of the packet data network gateway is returned to the mobility management entity by the DNS server, each address of the packet data network gateway needs to correspond to one protocol type of connection.

Steps S82 to S85 in the following are similar to Steps S52 to S56 in FIG. 5 in principle, which are not repeated here.

In addition, in other embodiments of the present invention, the method may also be implemented with the following process. First, an HSS may query a DNS server for information of a corresponding packet data network gateway. The HSS then provides the queried information of the packet data network gateway to a mobility management entity. The mobility management entity may initiate a create bearer context request message by using the packet data network gateway information. The following steps are similar to those in the embodiments above.

In view of the above, in the embodiments of the present invention, when the serving gateway requests the mobility management entity to establish a connection, a protocol type of connection supported by the packet data network gateway is indicated. In this way, the serving gateway may use a suitable (that the packet data network gateway supports) connection protocol to initiate establishment of a connection with the packet data network gateway, or establish a PMIP tunnel between the serving gateway and the packet data network gateway, or assign a care-of address for a user terminal to perform CMIP registration, so as to reduce a time delay when a connection is established.

It is apparent to those of ordinary skill in the art that all or a part of steps in the above method embodiments may be accomplished by relevant hardware that is instructed through a program. The program may be stored in a computer-readable storage medium. When the program is executed, the steps of the above method embodiments may be performed. The storage medium may be a magnetic disk, an optical disk, a read-only memory (ROM), or a random access memory (RAM).

The above descriptions are merely preferred embodiments of the present invention, but not intend to limit the scope of the present invention. Any modification, equivalent replacement, and improvement made without departing from the spirit and principle of the present invention fall within the scope of the present invention.

What is claimed is:

1. A method for establishing a connection, comprising:
generating, by a mobility management entity, a create bearer context request message; and
sending, by the mobility management entity, the create bearer context request message to a selected serving gateway, wherein the create bearer context request message comprises address information of at least one packet data network gateway and indication information of at least one protocol type of connection establishment, and wherein the selected serving gateway selects a protocol type of connection from the at least one protocol type of connection for establishing the connection with the packet data network gateway, wherein the protocol type of connection establishment selected by the selected serving gateway is at least one of a General Packet Radio Service Tunneling Protocol (GTP), a Proxy Mobile IP Protocol (PMIP), and a Client Mobile IP Protocol (CMIP).

2. The method according to claim 1, further comprising:
obtaining the address information of the packet data network gateway and the indication information of the at least one protocol type of connection establishment.

3. The method according to claim 2, wherein the process of obtaining the address information of the packet data network gateway and the indication information of the at least one protocol type of connection establishment comprises:
obtaining the address information of the packet data network gateway and the indication information of the at least one protocol type of connection establishment from a storage unit, wherein the storage unit is located in at least one of a Home Subscriber Server (HSS), a Domain Name Service Server (DNS server), and the Mobility Management Entity, and wherein the indication information of the at least one protocol type of connection establishment indicates at least one protocol type of connection supported by the packet data network gateway.

4. A method for establishing a connection, comprising:
receiving and analyzing, by a serving gateway, a create bearer context request message from a mobility management entity, and obtaining address information of packet data network gateway therein and indication information of at least one protocol type of connection establishment;
selecting, by the serving gateway, a protocol type of connection from the at least one protocol type of connection for establishing the connection with the packet data network gateway, wherein the protocol type of connection establishment selected by the serving gateway is at least one of a General Packet Radio Service Tunneling Protocol (GTP), a Proxy Mobile IP Protocol (PMIP), and a Client Mobile IP Protocol (CMIP); and
processing the create bearer context request message according to the protocol type of connection selected by the serving gateway.

5. The method according to claim 4, wherein the process of selecting the protocol type of connection for establishing the connection with the packet data network gateway comprises:
determining whether a protocol type of connection in the indication information of the at least one protocol type of connection establishment is supported by a serving gateway; and
selecting one protocol type of connection supported by the serving gateway for the serving gateway to use.

6. The method according to claim 5, wherein the process of processing the create bearer context request message according to the protocol type of connection selected by the serving gateway comprises:
forwarding the create bearer context request information to the packet data network gateway if the determined protocol type of connection is the GTP; or
sending, by the serving gateway, a corresponding PMIP-binding update message to the packet data network gateway if the determined protocol type of connection is the PMIP and establishing a PMIP tunnel between the serving gateway and the packet data network gateway; or
assigning and sending a care-of address to a user terminal for the user terminal to perform CMIP registration if the determined protocol type of connection is the CMIP.

7. A method for establishing a connection, implemented in a system comprising a mobility management entity, a serving gateway, and a packet data network gateway, comprising:
generating, by the mobility management entity, a create bearer context request message and sending the request message to the serving gateway, wherein the create bearer context request message comprises address information of the packet data network gateway and indication information of at least one protocol type of connection establishment;
analyzing, by the serving gateway, the create bearer context request message, and selecting a protocol type of connection from the at least one protocol type of connection for establishing the connection with the packet data network gateway, wherein the protocol type of connection establishment selected by the serving gateway is at least one of a General Packet Radio Service Tunneling Protocol (GTP), a Proxy Mobile IP Protocol (PMIP), and a Client Mobile IP Protocol (CMIP); and
processing, by the serving gateway, the create bearer context request message correspondingly according to the protocol type of connection selected by the serving gateway.

8. The method according to claim 7, wherein the process of selecting the protocol type of connection for establishing the connection with the packet data network gateway comprises:
determining whether a protocol type of connection in the indication information of the at least one protocol type of connection establishment is supported by a serving gateway; and
selecting one protocol type of connection supported by the serving gateway for the serving gateway to use.

9. The method according to claim 8, wherein the process of processing the create bearer context request message correspondingly according to the protocol type of connection selected by the serving gateway comprises:
forwarding the create bearer context request information to the packet data network gateway if the determined protocol type of connection is a General Packet Radio Service Tunneling Protocol (GTP); or
sending, by the serving gateway, a corresponding PMIP-binding update message to the packet data network gateway and establishing a Proxy Mobile IP Protocol (PMIP) tunnel between the serving gateway and the packet data network gateway if the determined protocol type of connection is a PMIP; or
assigning and sending a care-of address to the user terminal for the user terminal to perform CMIP registration if the determined protocol type of connection is a Client Mobile IP Protocol (CMIP).

10. A mobility management entity, comprising a processor and a sender, wherein:
the processor is configured to obtain address information of the packet data network gateway and indication information of at least one protocol type of connection establishment, and to generate a create bearer context request message; and
the sender is configured to send the message to a selected serving gateway, wherein the create bearer context request message comprises the address information of at least one packet data network gateway and the indication information of at least one protocol type of connection establishment, and the selected serving gateway selects a protocol type of connection from the at least one protocol type of connection for establishing the connection with the packet data network gateway, wherein the protocol type of connection establishment selected by the selected serving gateway is at least one of a General Packet Radio Service Tunneling Protocol (GTP), a Proxy Mobile IP Protocol (PMIP), and a Client Mobile IP Protocol (CMIP).

11. The mobility management entity according to claim 10, wherein the indication information of the at least one protocol type of connection establishment indicates at least one protocol type of connection supported by the packet data network gateway.

12. The mobility management entity according to claim 10, further comprising a memory, wherein:
the memory is configured to store the address information of at least one packet data network gateway and the indication information of the at least one protocol type of connection establishment.

13. The mobility management entity according to claim 10, wherein the processor is further configured to send a query request to a Domain Name Service Server (DNS server), and obtain the address information of the packet data network gateway and the indication information of the at least one protocol type of connection establishment.

14. A serving gateway, comprising:
a receiver, configured to receive a create bearer context request message from a mobility management entity; and
a processor, configured to analyze the create bearer context request message, obtain address information of a packet data network gateway and indication information of at least one protocol type of connection establishment, select a protocol type of connection from the at least one protocol type of connection for establishing a connection with the packet data network gateway, and process the create bearer context request message according to the protocol type of connection selected by the processor, wherein the protocol type of connection establishment selected by the processor is at least one of a General Packet Radio Service Tunneling Protocol (GTP), a Proxy Mobile IP Protocol (PMIP), and a Client Mobile IP Protocol (CMIP).

15. The serving gateway according to claim 14, wherein the processor is further configured to:
determine whether a protocol type of connection in the indication information of the at least one protocol type of connection establishment is supported by the serving gateway; and
select one protocol type of connection supported by the serving gateway for the serving gateway to use.

16. The serving gateway according to claim 15, further comprising a sender, wherein:
the sender forwards the create bearer context request information to the packet data network gateway and the processor establishes the connection with the packet data network gateway, if the protocol type of connection determined by the processor is the GTP; or
the sender sends a corresponding PMIP-binding update message to the packet data network gateway and the processor establishes a PMIP tunnel between the serving gateway and the packet data network gateway, if the protocol type of connection determined by the processor is the PMIP; or
the processor assigns a care-of address for the user terminal to perform CMIP registration, if the protocol type of connection determined by the processor is the CMIP and the sender sends the care-of address to the user terminal.

17. A network system, comprising a mobility management entity, a serving gateway, and a packet data network gateway, wherein,
the mobility management entity comprising a processor is configured to generate a create bearer context request message and send the message to a selected serving gateway, wherein the create bearer context request message comprises address information of the packet data network gateway and indication information of at least one protocol type of connection establishment; and
the serving gateway comprising a processor is configured to analyze the create bearer context request message from the mobility management entity, select a protocol type of connection from the at least one protocol type of connection for establishing a connection with the packet data network gateway, and process the create bearer context request message correspondingly according to the protocol type of connection selected by the serving gateway, wherein the protocol type of connection establishment selected by the serving gateway is at least one of a General Packet Radio Service Tunneling Protocol (GTP), a Proxy Mobile IP Protocol (PMIP), and a Client Mobile IP Protocol (CMIP).

18. The network system according to claim 17, wherein the serving gateway comprising the processor is further configured to:
determine whether a protocol type of connection in the indication information of the at least one protocol type of connection establishment is supported by the serving gateway; and
select one protocol type of connection supported by the serving gateway for the serving gateway to use.

19. The network system according to claim 17, further comprising:
a Home Subscriber Server (HSS) comprising a processor, configured to store address information of the packet data network gateway and the indication information of the at least one protocol type of connection establishment, or a Domain Name Service Server (DNS server) comprising a processor, configured to store address information of the packet data network gateway and the indication information of the at least one protocol type of connection establishment;
wherein, the mobility management entity comprising the processor, is configured to obtain address information of the packet data network gateway and the indication information of the at least one protocol type of connection establishment from the HSS or DNS, wherein the indication information of the at least one protocol type of connection establishment indicates the protocol type of connection supported by the packet data network gateway.

20. The network system according to claim 18, further comprising:
a Home Subscriber Server (HSS) comprising a processor, configured to store address information of the packet data network gateway and the indication information of the at least one protocol type of connection establishment, or a Domain Name Service Server (DNS server) comprising a processor, configured to store address information of the packet data network gateway and the indication information of the at least one protocol type of connection establishment;
wherein, the mobility management entity comprising the processor is configured to obtain address information of the packet data network gateway and the indication information of the at least one protocol type of connection establishment from the HSS or DNS, wherein the indication information of the at least one protocol type of connection establishment indicates the protocol type of connection supported by the packet data network gateway.

* * * * *